United States Patent [19]

Olesen

[11] 3,750,095
[45] July 31, 1973

[54] FOREIGN OBJECT LOCATOR

[76] Inventor: Ole V. Olesen, 7957 Queens Rd., Glen Burnie, Md.

[22] Filed: Sept. 15, 1970

[21] Appl. No.: 72,456

[52] U.S. Cl. .................................. 340/3 C, 340/3 R
[51] Int. Cl. .............................................. G01s 9/68
[58] Field of Search ................... 340/1 R, 1 C, 3 R, 340/3 C

[56] References Cited
UNITED STATES PATENTS

| 2,995,926 | 8/1961 | Dory | 340/3 C |
| 3,528,053 | 9/1970 | Rubin | 340/3 R |
| 3,096,516 | 7/1963 | Pendleton et al. | 340/3 C |
| 3,588,795 | 6/1971 | Linardos et al. | 340/1 C |

Primary Examiner—Richard A. Farley
Attorney—Rose & Edell

[57] ABSTRACT

The apparatus employs transmission and reflection of sonic impulses in water to detect foreign objects. A matrix sequentially and successively primes, individually and at a prescribed rate, each of a plurality of bulbs commencing with transmission of each pulse. Detection of a reflected pulse energizes the bulbs at the time of reception of such pulse. Since the rate of sequencing of the bulbs is fixed and the rate of transmission of sound in water is a constant, depth is indicated by the bulb illuminated by the reflected pulse. Range switching is accomplished by changing in discrete increments the rate of sequencing of the matrix. A one-shot multivibrator is employed to energize the bulbs to insure uniform illumination in spite of large variations in reflected energy.

11 Claims, 5 Drawing Figures

United States Patent [19]
Olesen
[11] 3,750,095
[45] July 31, 1973
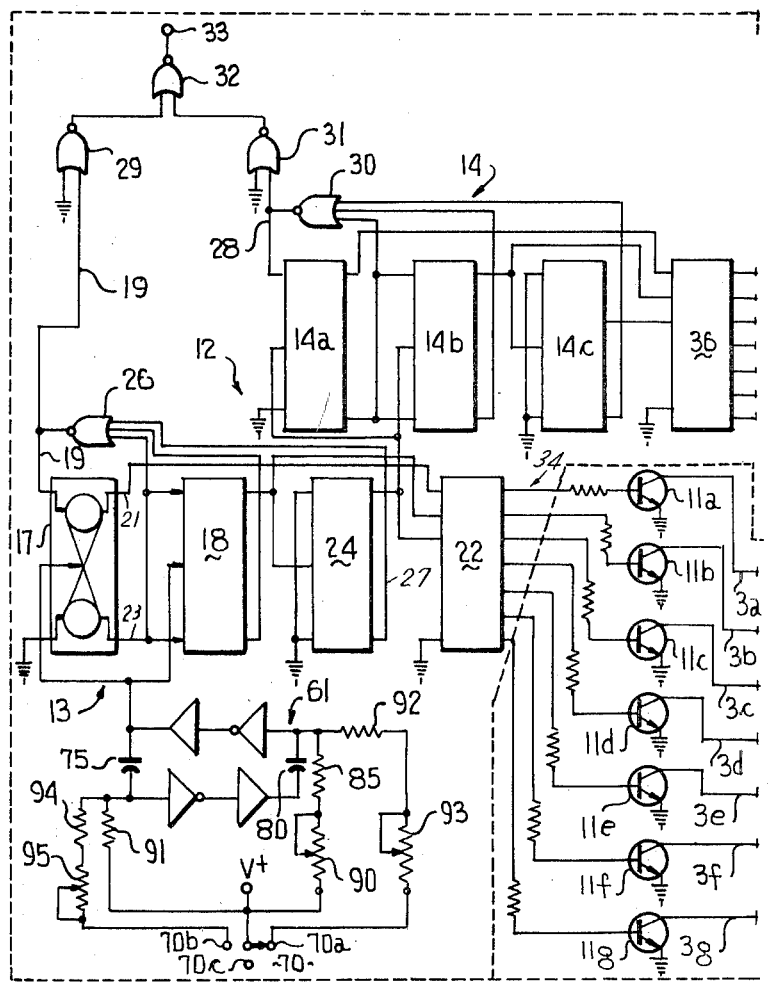

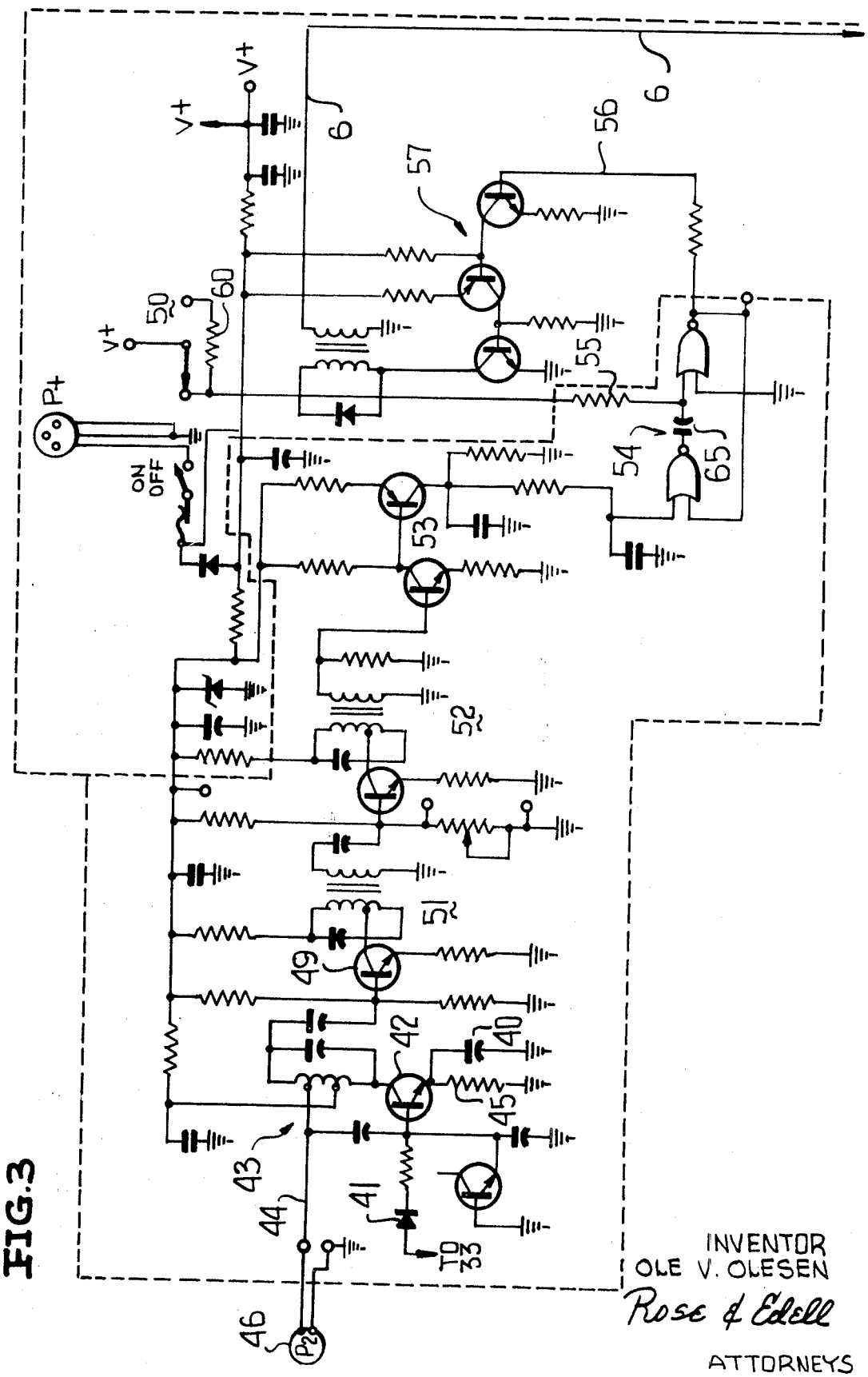

INVENTOR
OLE V. OLESEN

Rose & Edell

ATTORNEYS

FOREIGN OBJECT LOCATOR

BACKGROUND OF THE INVENTION

Numerous sonic foreign object detectors have been provided by the prior art. These devices are usually bulky, expensive, quite complex and difficult to read and use. Range switching is not provided in most units and where provided is quite expensive. Accuracy in the lower priced units is not good and where resonably good accuracy is provided the units are large and the cost excessive.

An object of the present invention is to provide a reasonably priced, small, highly sensitive and easily used sonic foreigh object detector having accurate range switching.

SUMMARY OF THE INVENTION

In accordance with the present invention a matrix circuit is employed to provide accurate visual indication of the depth of a foreign object, for instance, fish, in water. The matrix circuit consists of a plurality of rows and columns of leads with the rows of the matrix being selected by the first few stages of a counter and the columns being selected by the latter stages of the counter. The counter is driven by a clock (multivibrator) whose frequency may be changed to effect range switching. The latter stages of the counter circuit sequentially select a predetermined column for energization of associated visual indicators and the first stages of the counter completely sequence the rows of visual indicators once for each column. A particular indicator is selected by the intersection of the selected row and column.

The matrix does not energize the visual indicator, the visual indicator being energized only by the output of a one-shot multivibrator in the reflected pulse receiving circuit of the apparatus. More specifically, upon the count of the counter attaining its highest count, a blocking oscillator is energized to supply a high frequency to a sonic transmitter-receiver signal for one cycle of the clock. The blocking oscillator output signal is also applied through a receiver circuit and specifically through high "Q" IF stages to provide a high signal-to-noise ratio signal to a one-shot multivibrator which supplies energy to the matrix circuit. Since transmission always occurs on the last count of the counter, the energy supplied at this instant to the selection matrix always lights the same light, this light being designated as the transmit light.

The one-shot multivibrator remains in its unstable state for a predetermined time interval after the application of the leading edge of the pulse thereto so that the energy output of the one-shot multivibrator is constant for each range of the system.

Upon a pulse being reflected either from the bottom of the body of water or from fish it is received by the transmit-receive probe and applied to the receiver circuit. The one-shot multivibrator is again energized but now at a time determined by the depth of the object and/or bottom. The output signal of the one-shot multivibrator is applied to the matrix and energizes a bulb which is a function of the frequency of the clock and the interval between transmission and reception. Since the transmission time of sonic pulses through water is a known factor, 4800 feet per second, and the frequency of oscillation of the clock is a known factor, the bulbs or visual indicators can be calibrated for each range for specific depth and thus provide a clear indication of the depth of the object or the bottom.

Range switching is accomplished by changing the frequency of the clock. The rate of cycling of the counter and therefore matrix determines the bulb energized at the time of receipt of a reflected pulse. Thus as the clock frequency is changed the bulb which is primed at a specific elapsed time between transmission and reflection of a pulse is changed and contracts or expands, as the case may be, the scale or range of the apparatus.

The apparatus may be provided if desired with an audio alarm and if desired a shallow water alarm. Specifically, in the latter instance if a pulse is returned too rapidly, indicating very shallow water, an alarm circuit is energized.

It is an object of the present invention to provide a depth detector for objects in water which provides range switching without loss of accuracy.

It is another object of the present invention to provide an apparatus for detecting the depth of objects in water employing a relatively simple and inexpensive matrix selection circuit for providing a visual indication of the time at which a pulse is returned from an object and therefore the depth of the object.

It is another object of the present invention to provide in an apparatus for detecting the depth of objects in water, a visual indicator circuit in which sufficient energy is applied to the visual indicators to insure ease of viewing.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIGS. 1–3 combined constitute a schematic wiring diagram of the apparatus of the present invention;

DESCRIPTION OF THE PREFERRED EMBODIMENT

Figure 1:
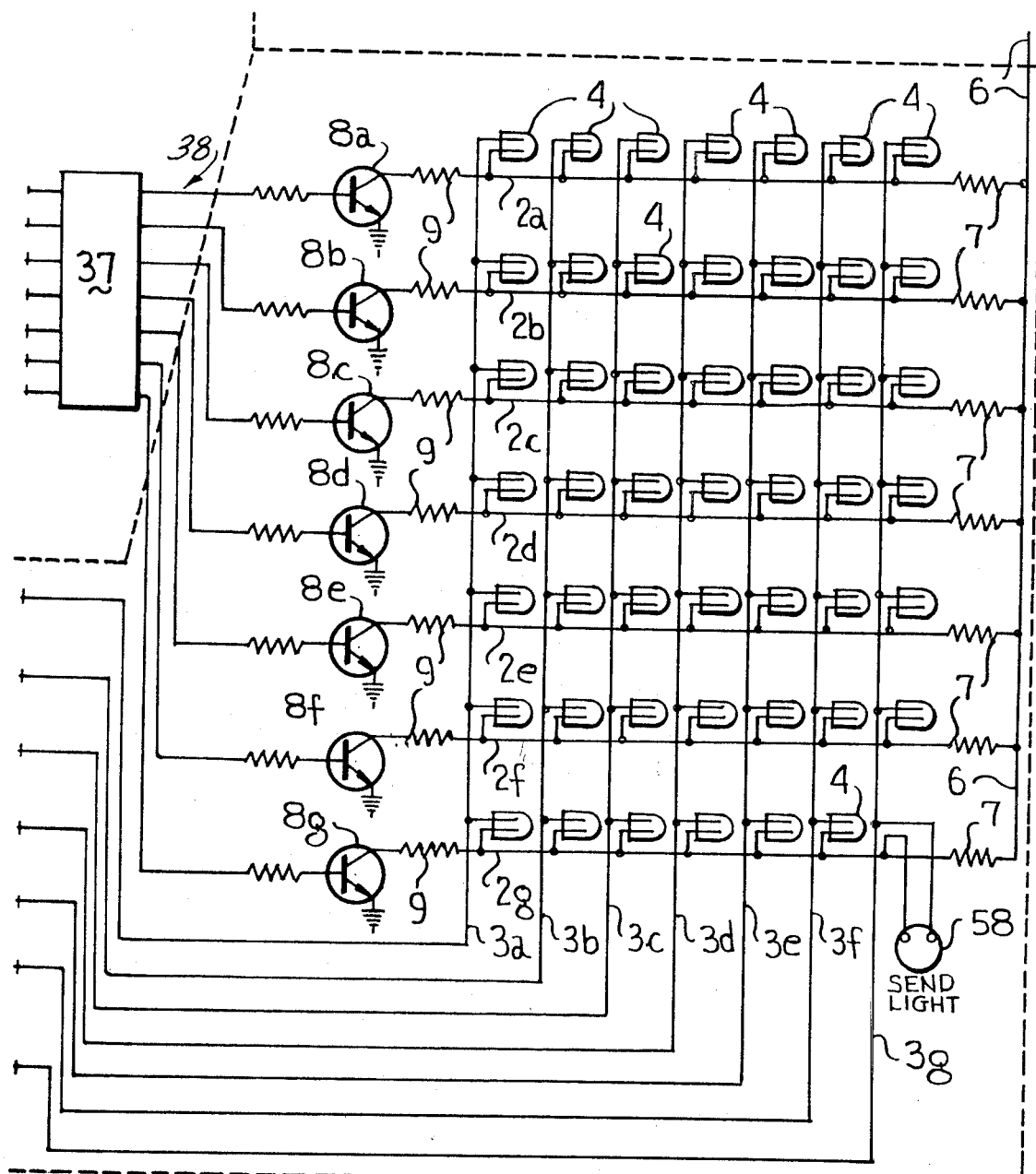
Figure 2:
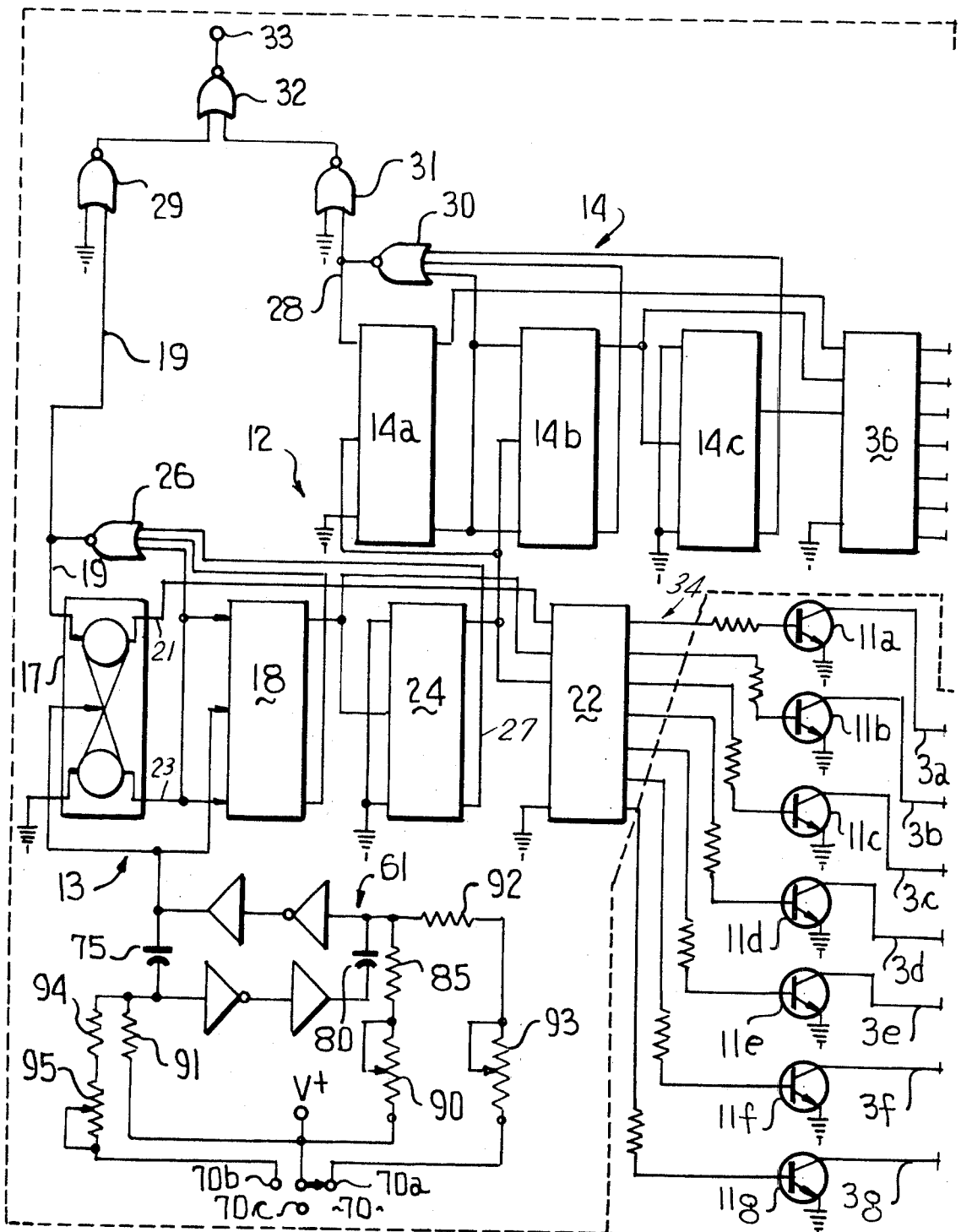

Referring now specifically to FIGS. 1 through 3 of the accompanying drawings, there is provided a complete circuit diagram of the apparatus of the present invention. The visual display apparatus comprises a matrix generally designated by the reference numeral 1 which, in the specific system illustrated, is a 7 × 7 matrix providing 49 different depth indications. The matrix comprises a plurality of horizontal leads or buses 2a through 2g and a series of vertical buses 3a – 3g, all as illustrated in FIG. 1. Each of a plurality of bulbs or glow lamps 4 has one input lead connected to a horizontal bus 2 and another input lead connected to a vertical bus 3. Each bulb 4 is connected differently in this pattern from each other bulb so that only one bulb can be energized at a given time as determined by a selected row and column. The energy for illuminating the bulbs is provided from a bus 6 which is connected to each of leads 2 through a different resistor 7.

Selection of the horizontal rows is made by identically connected seven transistors 8a through 8g with the collector of each of these transistors connected through an appropriate resistor 9 to the bus 2 carrying the corresponding letter designation. All but one of these transistors is rendered conductive at any given time by an appropriate circuit to be described subsequently. Energization of the leads 3a through 3g is controlled by a series of seven transistors 11a through 11g. The controls for these transistors renders only one of the transistors conductive at any given time. The transistors 11a through 11g or more specifically that one of the transistors which is conductive at any given time, provides a return path to ground through a selected bulb 4 when a voltage pulse appears on the lead 6. The transistors 8 when conductive, short their associated leads 2 to ground through their emitter-collector circuits so that voltage cannot be developed on these leads. Specifically, if a voltage pulse appears on the lead 6 it is transmitted through the resistors 7 to each of the horizontal buses 2a through 2g. The pulse is shorted to ground through all of the conductive transistors 8 and only on that lead associated with a transistor that is not conductive is the pulse maintained and applied to its associated row of bulbs. Thus the transistors 8 select a group of seven bulbs for possible energization. The transistors 11 select the vertical bus with which the bulb to be energized is associated and thus completes the selection matrix. Specifically, only one of the transistors 11 is energized and provides a return path to ground for the voltage pulse appearing on the selected lead 2.

The circuitry for selecting the specific transistors 8 and 11 to be energized or not energized as the case may be is determined by a counter circuit generally desigcurrence of a clock pulse on the lead 16, the stage 17 assumes a one condition. The stage 18 assumes a zero condition and the stage 24 is unchanged. On the second pulse the stage 17 shifts to a zero condition but the stage 18 is unaffected. Since the stage 18 is unaffected the stage 24 is also unaffected. On the next pulse stage 17 again assumes a one condition and the stage 18 shifts to the one condition and upon the shift from the zero to the one condition of the stage 18, the stage 24 changes condition. On the fourth pulse the stage 17 again changes its condition but a one-to-zero shift does not affect the stage 18 and also does not affect the stage 24. On the fifth pulse the stage 17 again shifts from zero to one which shift causes the stage 18 to shift from one to zero but the stage 24 is again unaffected since a shift from the one to the zero condition of the stage 18 does not affect stage 24. On the six pulse, the stage 17 again assumes a zero condition but a shift from a one to a zero condition does not affect the stage and therefore does not affect the stage 24. Under these conditions then, all three stages have a zero output and in consequence no inputs are provided to the NOR gate 26 and a high voltage is developed on the lead 19. Upon the presentation of the seventh clock pulse, the stage 17 cannot shift since its upper stage is held conductive by the voltage on the lead 19. However, the clock pulse on 16 is applied to the stage 18 and causes a shift in that stage from zero to one which causes the stage 24 to shift from zero to one and the starting conditions are re-established. Thus the binary counter 13 is converted to a binary-coded septal-counter and a pulse is developed on the lead 19 on every seven counts for addithis converter however is applied to an inverter 37 so that of its seven output leads only one of the leads does not have a high voltage applied thereto at any given instant. These leads, which are generally deisgnated by the reference numeral 38, are applied to the base electrodes of the transistors 8a through 8g and thus all but one of these transistors is conductive at any given time.

Referring now specifically to the transmit-receive section of the apparatus, the terminal 33 is connected through a diode 41 to a base electrode of a transistor 42 forming the active element of a blocking oscillator generally designated by reference numeral 43. The blocking oscillator oscillates at about 200 KHz and an output voltage is developed on the lead 44 which is connected to a transmit probe 46 of the apparatus.

The lead 44 is connected to a tap on blocking oscillator transformer 47 which has one end connected to collector electrode 48 of the transistor 42 and has the other end capacitively coupled to the base electrode of a transistor 49 of a first IF stage 51 of the receiver circuit. The blocking oscillator oscillates for a period approximately equal to the width of the pulse produced at terminal 33 when the apparatus is operating in the 50 foot range; i.e. for approximately 220$\mu$s. When the pulse appearing at the terminal 33 is longer than 220 $\mu$s, this occurring when the apparatus is operating in the 100 foot or 200 foot range, the blocking oscillator 43 is shut off by capacitor 40 connected in the emitter circuit of the transistor 42 in parallel with a resistor 45. The capacitor is of such a size as to be changed in about 220$\mu$s, to a potential relative to the base potential sufficient to prevent further conduction of the transistor 42. The time constant of capacitor 40, resistor 45 is such as to insure discharge of the capacitor before reception of the next transmission pulse.

By restricting the length of the transmitted pulse to a constant length, the area of scan by each pulse is maintained constant and excessively large areas are not scanned. Variations of scan area render interpretation of the readings difficult which scan of excessively large areas may, particularly in regions of sharp slopes of the floor of the body of water, produce energization of an excessive number of lights 4. In one test, even with the restricted transmission time of the present invention, the slope of the bottom was so steep that 14 bulbs were illuminated.

Proceeding with the description of the circuit, the first IF stage is connected to a second IF stage 52 of the receiver circuit which is then coupled to an active demodulator 53. The active detector is employed since it can trigger on a half volt pulse whereas in the standard diode detector a half volt alone is lost in rendering the diode active. Thus the use of the active detector requires less gain if the IF and therefore introduces less noise into the circuit.

The detected output signal which is a pulse of a width determined by the width of the period of oscillation of the blocking oscillator 43, is applied to a monostable or one-shot multivibrator circuit 54. The period during which the circuit 54 produces an output signal is chosen to insure that the circuit is not triggered twice on a transmitted pulse and further to ensure that a bright display is provided regardless of the range of operation. This latter feature requires a change in the timing of the circuit at least when switching from the 50 foot to the 100 foot range.

The minimum period of the output signal from the circuit 54 occurs in the 50 foot range of operation and is approximately equal to the period of oscillation of the blocking oscillator 43 plus about 10$\mu$s; the latter to accommodate the delay in the circuit from the blocking oscillator to the detector. The blocking oscillator transmits for 220$\mu$s and thus in the 50 foot range the circuit 54 is active for approximately 230$\mu$s. Thus the circuit cannot respond twice to the same transmitted pulse. Conversely, by causing the one shot to time out as rapidly as it does, that is, within 10 microsections after termination of the transmitted pulse which is received from the active detector 53, fish that are only a foot below the boat can be detected or more specifically separated from the indication of the transmitted pulse.

The timing of the monostable circuit 54 is different when operating in the 100 and 200 foot ranges from the timing in the 50 foot range. When operating in the 50 foot range the cycling of the system is sufficiently rapid that 230$\mu$s of energization of the bulbs 4 during each cycle provides a bright display. However when operating in the 100 or 200 foot ranges the cycling rate of the circuit is reduced to one-half and one-fourth, respectively, of the rate for the 50 foot range and the display would be of marginal brillance if the same timing were employed.

In order to overcome this difficulty, the astable period of the circuit 54 is doubled in the 100 and 200 foot operating ranges relative to the period when operating in the 50 foot range. It is found that the aforesaid increase is sufficient for both the 100 and 200 foot ranges to insure a highly visible indication.

The change in timing is effected by a switch 50 slaved to the range switch to be described subsequently. Specifically, the astable interval of the circuit 54 is determined by an RC circuit 55–65, the resistor 65 being connected when operation is in the 50 foot range through the switch 50 to a source of voltage. When it is desired to increase the astable period of the circuit, the switch is positioned such as to include a resistor 60 between the voltage source and the resistor 55 to increase (about double) the RC time constant.

Continuing with the description, the pulse appearing on the lead 56 is applied through several stages of amplification generally designated by the reference numeral 57 to develop about 200 volts on the lead 6 which is applied to the matrix circuit 1.

As previously indicated, the pulse appearing at the terminal 33 occurs on the 49th pulse of each cycle and the bulb selected by the 49th count of the counter circuit 12, which bulb is generally designated by the reference numeral 58, is employed as a "send" light. The pulsing of this light indicates to the operator that the system is operating and that pulses are being transmitted by the probe 46. The energization of any other light bulb 4 in the matrix indicates a reflection from something in the water. This reflection may be from the bottom, in which case if no other object is present a constant scan of the depth of the bottom surface is provided. However if fish are detected a further bulb is illuminated and if the bottom lies within the range of the instrument and fish are detected a total of three lights operate for each cycle of operation; the send light 58, a light 4 indicating a depth less than the bottom, that is, the fish or some other object, and a light 4 at the depth of the bottom of the body of water. If the depth is greater than the range of the instrument then only two lights operate, the send light and the light indicating the presence of an object such as fish.

The instrument described above is of such sensitivity that during test, fish of only a 6 inch length have consistently been detected at depths of 30 feet. Such sensitivity is due to the use of highly selective IF sections, thus minimizing noise, and the use of the active detector 53 and monostable circuit 54. These three components combine to provide an excellent signal-to-noise ratio in conjunction with a high degree of sensitivity.

Range switching is accomplished by means of a variable frequency oscillator generally designated by the reference numeral 61. The oscillator is a conventional multivibrator, the frequency of which is controlled by several resistors which may be switched in or out of the circuit to control the time constant of the RC feedback circuits of the feedback oscillator. The instrument illustrated has three ranges, a 50 foot range, a 100 foot range and a 200 foot range. The frequency for the 200 foot range is approximately 600 Hz, for the 100 foot range approximately 1.2 KHz and for the 50 foot range is approximately 2.4 KHz. Since the blocking oscillator oscillates at a frequency of 200 KHz and the pulse is transmitted for a period equal to the period of the frequency for the 50 foot range, i.e. approximately 0.4 milliseconds, the blocking oscillator oscillates through about 80 cycles for each transmission regardless of the frequency of the oscillator 61. The IF strip is tuned to 200 KHz as a center frequency and must accommodate a band width 5 KHz the frequency determined by the width of the 49th pulse, i.e., 220μs. Thus a Q of 40 may be employed. However the unloaded Q, due to the use of active collectors in the IF, is 110 so that if the threshold of the active detector is not exceeded noise rejection is quite high; this being the case when noise rejection is critical.

The frequency of the oscillator 61 controls range since it determines the period required to cycle the matrix 1. The frequency is correlated to range by the velocity of sound in water which is nominally 4800 ft./sec. Thus with a 50 foot range the sonic wave traverses 100 feet in 1/48 seconds and the matrix must be cycled in this elapsed time. Using a nominal 50 positions for the matrix the oscillator must go through 50 cycles in 1/48 seconds; a frequency of 2.4 KHz. Each increment in cycling of the counter occurs in 0.4 milliseconds or approximately 1.92 feet which is equivalent to a range of 1 foot. Thus when operating in the 50 foot range, objects at about 1 foot below the probe or transducer 46 may be detected.

The basic multivibrator includes dual feedback circuits in a conventional manner with coupling being effected by capacitors 75 and 80. Resistors 85, 90 and 91 bridge the capacitor 80 and the junction of the resistors 90 and 91 is connected to a voltage source. When the oscillator is to operate in the 50 foot range a switch 70 has its movable contact in engagement with a contact 70a so that resistors 92 and 93 are placed in parallel with the resistors 85 and 90 to establish a frequency of 2,400 Hz with a 50 percent duty cycle. When it is desired to switch to the 100 foot range the switch 70 is operated to place its movable contact in engagement with stationary contact 70b and place resistors 94 and 95 in parallel with resistor 91 and remove resistors 92 and 93 from the circuit. The operation of the circuit now becomes asymmetrical with one half cycle remaining the same and the other half cycle tripling to provide a period of oscillation that is doubled relative to the 50 foot range. In the 200 foot range mode of operation only resistors 85, 90 and 91 remain in the circuit and the frequency is doubled relative to the 100 foot range mode of operation.

Thus by the simple expedient of changing the frequency of the oscillator 61 in discrete steps, the period required to cycle the matrix 1 is changed so that each light of the matrix represents a different depth for each range of operation.

In the above description specific circuits and arrangements are assumed. However the principles of operation do not depend on such details. Thus the 49 increment matrix is assumed only for purposes of explanation and any appropriate numer of points may be employed. Similarly, specific oscillators, time delay circuits, counters, etc., may be replaced by other circuits to accomplish the same result; the circuits illustrated being simple and inexpensive but not constituting the only circuits which may be utilized in this system.

Further the one-shot multivibrator 54 may be permitted to oscillate for each full cycle of the oscillator 61 if the power available on the craft is sufficient to supply the energy required for such long periods of activation of the bulbs. Also other types of visual indicators may be employed where less light is required or any entirely different type of visual display (for instance, flags) are desired.

Figure 5:
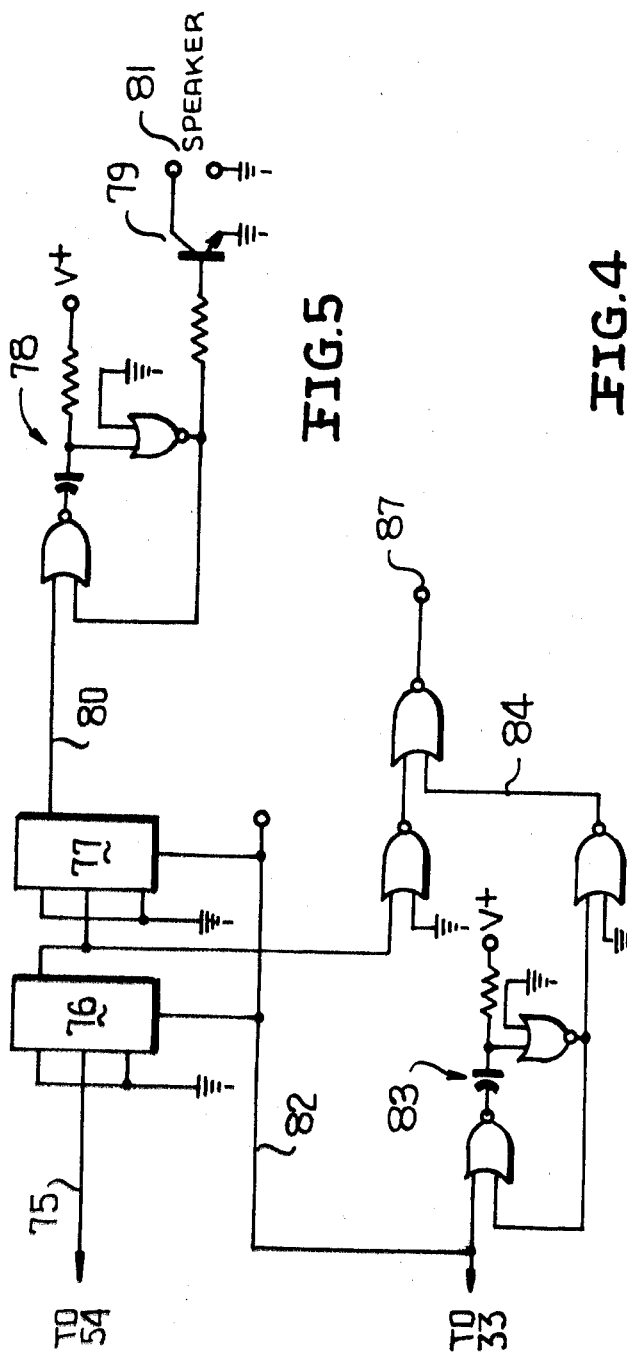
FIG. 5 is a schematic wiring diagram of circuits providing additional features of the apparatus.
Figure 4:
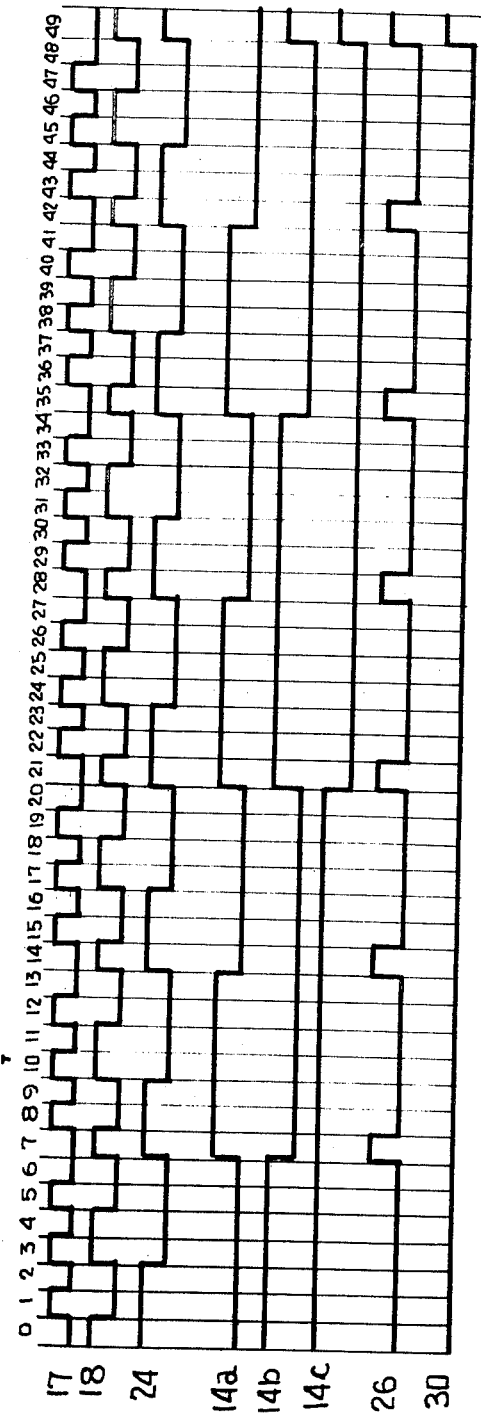
FIG. 4 is a timing diagram illustrating the pulse timing at various locations in the counter circuit.

Reference is now made to FIG. 5 which illustrates a combined audio alarm and a shallow water alarm. The output of the one-shot multivibrator 54 is applied via a lead 75 to a first counter stage 76, the output of which is applied to a second counter stage 77. The output of the second counter stage is applied to a one-shot multivibrator 78 whose output is applied through an amplifier 79 to an audio alarm or speaker 81. Each of the stages 76 and 77 has a reset input connected to a lead 82 which is in turn connected to the terminal 33. Thus each time a pulse is transmitted by the probe 46 the counter 76-77 is cleared and maintained at zero count during transmission. After transmission an output voltage appears on the lead 75 whenever a reflected pulse is detected. When two pulses have been applied to the lead 75, indicating detection of a foreign object as well as the bottom of the body of water during one cycle of operation, a voltage appears on output lead 80 of the counter stage 77, fires the one-shot multivibrator 78 and sounds the speaker 81, i.e., the foreign object alarm.

The shallow water alarm includes a further one-shot multivibrator 83 also from the terminal 33 of the counter section, that is the transmit terminal. The one-shot multivibrator 83 defines a specific time within which if a reflected pulse is received, the water is very shallow. Thus, for instance, the circuit 83 may be set to time out, that is, provide a low voltage on its output lead 84, at a time equivalent, for instance, to two feet. If the counter stage 76 has received one pulse within the period established by circuit 83, the voltage on lead 86, the "one" lead of the stage 76, is high and an output signal is developed on a terminal 87 and either sounds an alarm or provides a visual indication of shallow water.

While I have described and illustrated one specific embodiment of my invention, it will be clear that variations of the details of construction which are specifically illustrated and described may be resorted to without departing from the true spirit and scope of the invention as defined in the appended claims.

I claim:

1. A depth detector for use in a sonic wave transmitting medium comprising
a plurality of indicators,
control means for priming said indcators to produce an indication upon application of an energizing signal thereto,
means for applying energizing signals to said indicators,
said control means including timing means for sequentially and cyclically priming said indicators, one at a time each for the same finite length of time,
said timing means including a variable frequency oscillator,
means for transmitting a sonic pulse,
means responsive to aid timing means for energizing said means for transmitting concurrently with priming of a predetermined one of said indicators,
circuit means responsive to said means for energizing for generating said energizing signal to activate said one indicator,
means for receiving a sonic pulse,
said circuit means being responsive to reception of a sonic pulse by said means for receiving for generating another energizing signal,
means for changing the depth range of said depth detector, and
said last mentioned means including means for changing the frequency of oscillation of said oscillator in discrete predetermined increments.

2. The combination according to claim 1 wherein said circuit means includes a one-shot multivibrator having a variable period and means for changing the period of said multivibrator as a function of frequency of said oscillator.

3. The combination according to claim 1 wherein said means for enerizing said means for transmitting comprises a blocking oscillator, said blocking oscillator having means for terminating oscillation thereof after a prescribed period of time approximately equal to the time of travel of sonic waves in said medium for the minimum depth to be measured in the minimum depth range.

4. The combination according to claim 3 wherein said circuit means includes a one-shot multivibrator, means establishing a first predetermined period approximately equal to said period of said blocking oscillator during operation of said oscillator at a frequency establishing a minimum depth range and establishing a second predetermined period greater than said first predetermined period during operation of said oscillator at a frequency establishing a greater depth range.

5. The combination according to claim 3 wherein said variable frequency oscillator has a period equal to said finite length of time,
said blocking oscillator having a frequency at least equal to an order of magnitude greater than said variable frequency oscillator.

6. The combination according to claim 5 wherein said circuit means includes at least one IF stage tuned to the frequency of said blocking oscillator.

7. The combination according to claim 6 wherein said circuit means includes an active detector for detecting the envelope of the sonic pulse,
a one-shot multivibrator and
means responsive to the output signal of said active detector for triggering said multivibrator.

8. The combination according to claim 1 wherein said control means comprises a matrix having two groups of electrical buses,
means for grounding all but one of said buses of a first group of said buses,
means for grounding only one of said buses of a second group of said buses,
said indicators comprising electrically energized light emitting means,
means connecting each light emitting means across a unique pair of buses of said first and second group of buses and
means for applying said energizing signals to said first group of buses.

9. A depth detector for use in a sonic wave transmitting medium comprising
a plurality of indicators,
control means for priming said indicators to produce a detectable indication upon application of an energizing signal thereto,
said control means including a matrix having two groups of electrical conductors and a timing means operable at a prescribed cyclic frequency,
said indicators each being connected between a unique pair of conductors each of a different group of said two groups of conductors,
means responsive to said timing means for generating a sonic pulse,
means for receiving a reflected sonic pulse to produce an energizing signal,
means responsive to said timing means for sequentially and cyclically connecting said means for receiving to said conductors of a first group of said conductors,
said timing means sequentially and cylically applying a priming signal to said conductors of the other of said groups of conductors at a rate which is predetermined relative to the rate at which energizing signals are applied to said conductors of said first group of conductors, and
means for varying the frequency of said timing means.

10. A depth detector for use in a sonic wave transmitting medium comprising
a plurality of indicators,
control means for priming said indicators to produce a detectable indication upon application of an energizing signal thereto,
said control means including a matrix having two groups of electrical conductors and a timing means operable at a prescribed cyclic frequency,
first means responsive to said timing means for sequentially and cyclically connecting all but one of said conductors of a first group of said two groups of conductors to a reference potential,
further means responsive to said timing means for sequentially and cyclically connecting one of said conductors of the other of said groups of conductors to the reference potential,
said indicators each being connected across a unique pair of conductors of said first and other groups of conductors,
means for transmitting a sonic pulse, means for receiving a sonic pulse to generate an energizing signal, and means for applying said energizing signal to said one of said conductors of said first group of conductors.

11. The combination according to claim 10 wherein said first and further means comprise transistors connecting said conductors to a reference potential through their collector-emitter circuits when activated, said timing means sequentially and cyclically activating said transistors.

* * * * *